United States Patent
Moran et al.

(10) Patent No.: US 9,574,522 B2
(45) Date of Patent: Feb. 21, 2017

(54) ASSEMBLY WITH CYLINDER HEAD HAVING INTEGRATED EXHAUST MANIFOLD AND METHOD OF MANUFACTURING SAME

(71) Applicant: GM GLOBAL TECHNOLOGY OPERATIONS LLC, Detroit, MI (US)

(72) Inventors: Robert J. Moran, Ann Arbor, MI (US); Kevin M. Luchansky, Sterling Heights, MI (US); Eric C. Douse, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 53 days.

(21) Appl. No.: 14/469,766

(22) Filed: Aug. 27, 2014

(65) Prior Publication Data

US 2016/0061149 A1    Mar. 3, 2016

(51) Int. Cl.
```
F02B 47/08    (2006.01)
F02M 25/07    (2006.01)
F02F 1/24     (2006.01)
F02F 1/40     (2006.01)
```
(52) U.S. Cl.
CPC ............ *F02M 25/071* (2013.01); *F02F 1/243* (2013.01); *F02F 1/40* (2013.01); *F02M 25/0727* (2013.01); *F02M 25/0752* (2013.01); *Y02T 10/121* (2013.01)

(58) Field of Classification Search
CPC ............................... F02B 37/025; F02B 37/22
USPC ............................. 123/568.12; 60/323, 324
See application file for complete search history.

(56) References Cited

U.S. PATENT DOCUMENTS

| | | | |
|---|---|---|---|
| 6,435,259 B1 | 8/2002 | Baker et al. | |
| 6,786,190 B2 | 9/2004 | Wu et al. | |
| 7,100,560 B2 | 9/2006 | Yageta et al. | |
| 7,438,117 B2 | 10/2008 | Douro et al. | |
| 8,061,131 B2 * | 11/2011 | Kuhlbach | F02F 1/243 123/193.5 |
| 8,210,234 B2 | 7/2012 | Goettsch | |
| 8,235,685 B2 | 8/2012 | Moran et al. | |
| 8,256,402 B2 * | 9/2012 | Yamagata | F01N 13/10 123/559.1 |
| 9,133,730 B2 * | 9/2015 | Joergl | F01N 13/105 |

(Continued)

OTHER PUBLICATIONS

"Cylinder Head with Single Plane Integrated Exhaust Manifold and Dual Scroll Turbocharger"; Research Disclosure database #595053; published digitally Oct. 21, 2013; published in paper journal Nov. 2013; ISSN 0374-4353.

*Primary Examiner* — Marguerite McMahon
*Assistant Examiner* — James Kim
(74) *Attorney, Agent, or Firm* — Quinn Law Group, PLLC

(57) ABSTRACT

An assembly includes a cylinder head with an integrated exhaust manifold that has four exhaust flow passages directing cylinder exhaust from inlets arranged to correspond with exhaust from the four cylinders, respectively, and has only three outlets. The assembly includes a twin scroll turbocharger having a housing with a first scroll passage, a second scroll passage, and only three inlets. Two of the exhaust flow passages join in the cylinder head to direct exhaust flow into only one of the inlets of the housing and through the first scroll passage. Exhaust flow through the other two of the exhaust flow passages flows separately into the other two inlets in the housing and joins in the housing to flow through the second scroll passage.

10 Claims, 9 Drawing Sheets

(56) References Cited

U.S. PATENT DOCUMENTS

| | | | |
|---|---|---|---|
| 2008/0308050 A1* | 12/2008 | Kuhlbach | F02F 1/243 123/41.82 R |
| 2010/0038901 A1* | 2/2010 | Schmidt | F01N 13/102 285/294.1 |
| 2010/0126153 A1* | 5/2010 | Nagafuchi | F01N 13/001 60/299 |
| 2010/0224144 A1 | 9/2010 | Lopez-Crevillen et al. | |
| 2011/0239638 A1* | 10/2011 | Yamagata | F02D 9/04 60/324 |
| 2011/0296684 A1* | 12/2011 | Yamamoto | B23P 13/02 29/888.06 |
| 2013/0014497 A1* | 1/2013 | Wu | F01N 13/10 60/323 |
| 2013/0055971 A1* | 3/2013 | Brewer | F02F 1/24 123/41.82 R |
| 2013/0167803 A1* | 7/2013 | Kuhlbach | F01N 13/105 123/406.11 |
| 2015/0098815 A1* | 4/2015 | Chu | F01N 13/102 415/213.1 |

* cited by examiner

ASSEMBLY WITH CYLINDER HEAD HAVING INTEGRATED EXHAUST MANIFOLD AND METHOD OF MANUFACTURING SAME

TECHNICAL FIELD

The present teachings generally include an engine assembly with a cylinder head and turbocharger, and a method of manufacturing the same.

BACKGROUND

Cast cylinder heads often have multiple internal cavities for exhaust flow or for coolant flow. Manufacturing a cylinder head with multiple cavities can be difficult and time consuming. For example, cavities that have complex shapes and that overlap one another in different directions can require many core sections, as well as complex core boxes with multiple slides to create a core assembly used in the cylinder head casting mold. Additionally, cylinder heads that have integrated exhaust manifolds must be configured so that the exhaust passages are properly positioned to fluidly communicate with turbochargers. Flow adapters are often required between the cylinder head and the turbocharger in order to properly connect the passages.

SUMMARY

An assembly includes a cylinder head with an integrated exhaust manifold that has four exhaust flow passages directing cylinder exhaust from inlets arranged to correspond with exhaust from four in-line cylinders of an engine. The integrated exhaust manifold has only three outlets. A twin scroll turbocharger has a housing with a first scroll passage, a second scroll passage, and only three inlets. The housing is mounted to the cylinder head with the three inlets of the housing in fluid communication with the three outlets of the cylinder head. The integrated exhaust manifold and the housing are configured so that two of the exhaust flow passages join in the cylinder head to direct exhaust flow into only one of the inlets of the turbocharger housing and through the first scroll passage. Exhaust flow through the other two of the exhaust flow passages flows separately into the other two inlets in the turbocharger housing and then joins in the housing to flow through the second scroll passage.

The exhaust flow passages of the integrated exhaust manifold may be configured so that they do not overlap one another in a vertical direction. In other words, the outlets of the exhaust manifold are not stacked vertically, and a single plane intersects all of the exhaust flow passages at the outlets. This enables a single core box having only an upper half mold and a lower half mold to be used to mold an exhaust port sand core to be used to cast the cylinder head with the integrated exhaust manifold.

The cylinder head also has a first coolant cavity positioned adjacent to each of the exhaust flow passages, and a second coolant cavity positioned adjacent to each of the exhaust flow passages with the exhaust flow passages between the first coolant cavity and the second coolant cavity. The first and the second coolant cavities together substantially surround the exhaust passages at the three outlets of the integrated exhaust manifold. At least a first and a second machined passage are provided in the cylinder head. The first machined passage extends between the first exhaust flow passage and the first common flow passage and connects the first coolant cavity with the second coolant cavity. The second machined passage extends between the fourth exhaust flow passage and the first common flow passage and connects the first coolant cavity with the second coolant cavity.

The cylinder head can thus be manufactured by assembling a core assembly in a cylinder head die. This includes installing a first coolant core in the cylinder head die, installing an exhaust port sand core in the cylinder head die so that the first coolant core is on one side of the exhaust port sand core, and installing a second coolant core on an opposite side of the exhaust port sand core in the cylinder head die. The cylinder head die is then closed. The cylinder head is then cast around the core assembly in the cylinder head casting mold such that an integrated exhaust manifold is formed by the exhaust port sand core, and first and second coolant cavities are formed by the first and second coolant cores, respectively. The integrated exhaust manifold has four exhaust flow passages, two of which merge into a single exhaust flow passage in correspondence with the four exhaust flow core sections of the exhaust port sand core, such that the integrated exhaust manifold has three outlets. The cylinder head can then be machined, which includes machining at least first and second connector passages through the cylinder head to connect the first and second coolant cavities. The engine can then be assembled, which includes mounting a twin scroll turbocharger with three inlets to the cylinder head so that exhaust flows through the three outlets or the cylinder head into the three inlets of the twin scroll turbocharger, without any flow adapter between the cylinder head and the turbocharger.

The above features and advantages and other features and advantages of the present teachings are readily apparent from the following detailed description of the best modes for carrying out the present teachings when taken in connection with the accompanying drawings.

DETAILED DESCRIPTION

Figure 1:
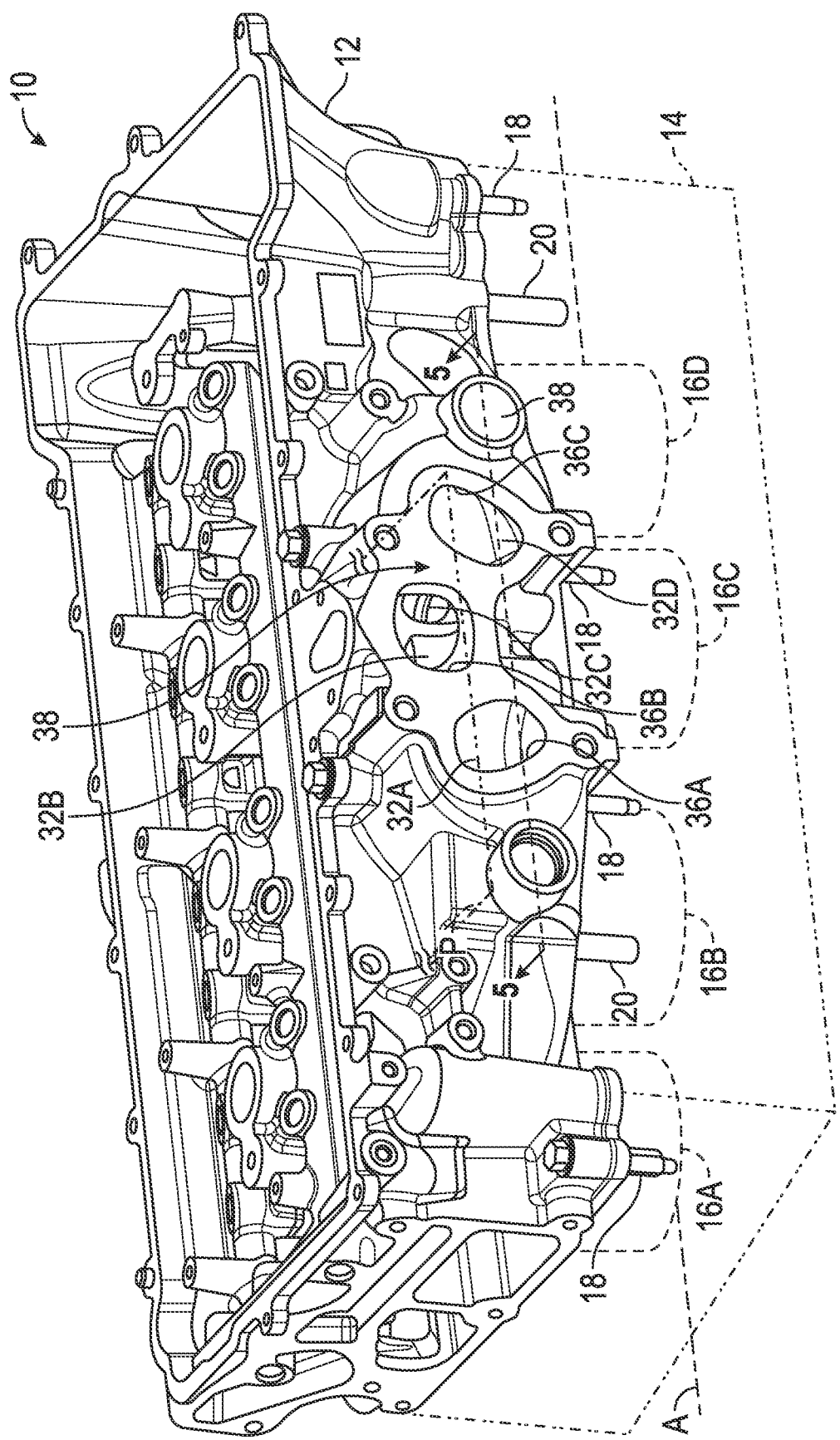
FIG. 1 is a schematic illustration in perspective view of an engine assembly with a cylinder head with an integrated exhaust manifold mounted to a cylinder block shown in phantom in accordance with the present teachings.

Referring to the drawings, wherein like reference numbers refer to like components throughout the several views, FIG. 1 shows an engine assembly 10 that includes a cylinder head 12 and an engine cylinder block 14, shown in phantom, to which the cylinder head 12 is mounted. The engine assembly 10 is an in-line, four cylinder engine. The cylinder block 14 has four cylinders, including a first cylinder 16A, a second cylinder 16B, a third cylinder 16C, and a fourth cylinder 16D arranged along an axis A generally centered along cylinder block 14.

The cylinder head 12 mounts to the cylinder block 14 with various bolts and fasteners 18, 20. Intake valves 22 and exhaust valves 24 are mounted to a lower side 26 (i.e., a cylinder head-facing side) of the cylinder head 12 and are electronically controlled by an engine controller (not shown) to control air flow through the intake valves 22 into the cylinders 16A-16D, and exhaust flow out of the cylinders 16A-16D through the exhaust valves 24 to meet a predetermined valve timing and engine firing schedule. The engine controller also controls fuel delivery and ignition in the cylinders. The firing order of the cylinders may be first cylinder, 16A, third cylinder 16C, fourth cylinder 16D, and second cylinder 16B.

Figure 2:
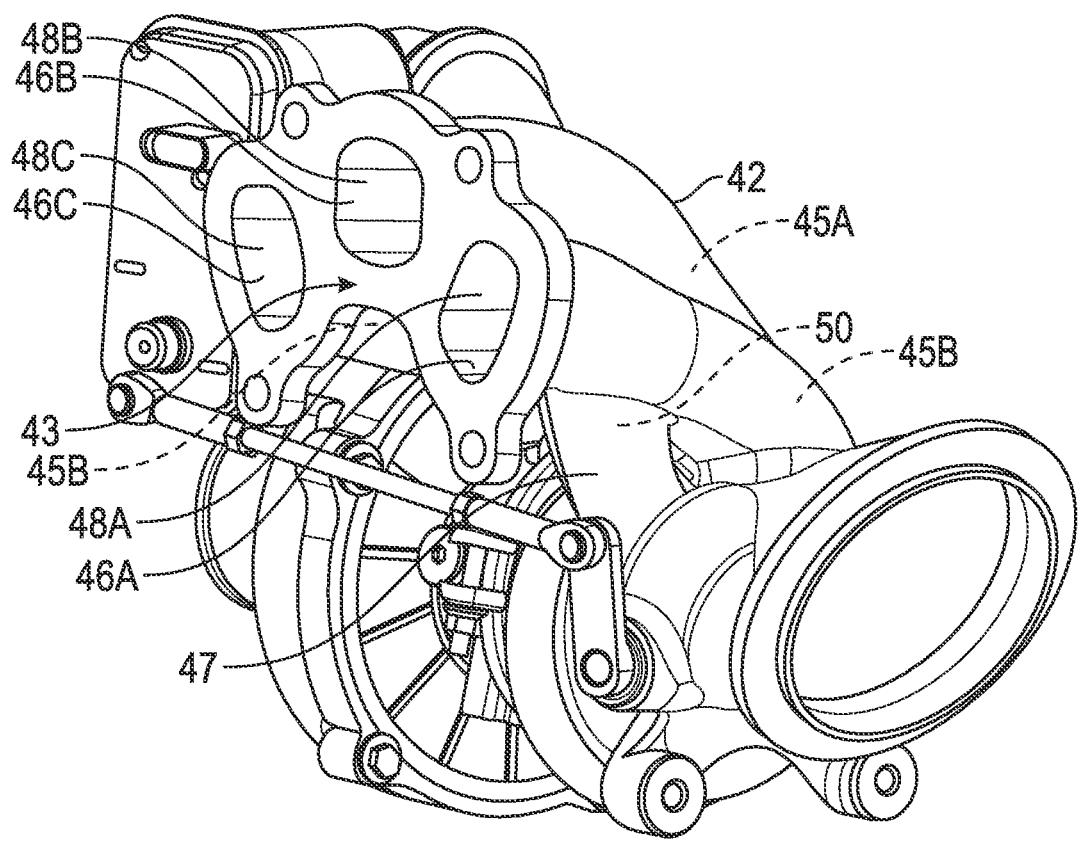
FIG. 2 is a schematic illustration in perspective view of a twin scroll turbocharger in accordance with the present teachings.
Figure 3:
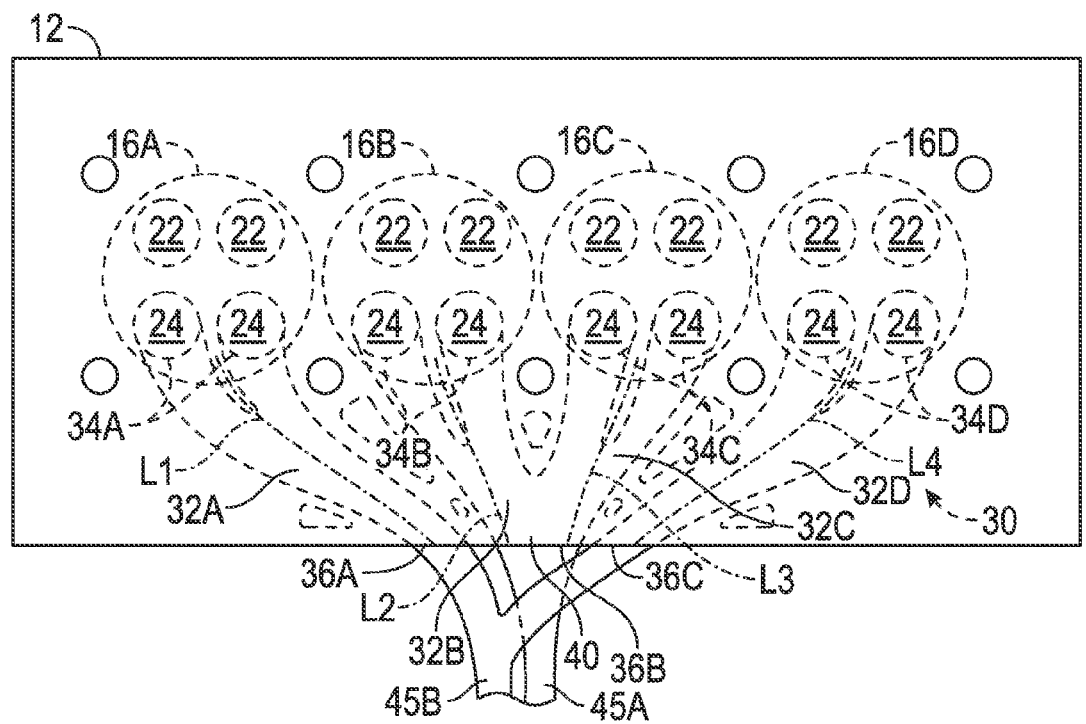
FIG. 3 is a schematic plan view illustration of the cylinder head of FIG. 1 with the turbocharger of FIG. 2 in fragmentary view mounted thereto.

The cylinder head 12 can be used with a dual scroll turbocharger 28 shown in FIG. 2, and has an integrated exhaust manifold 30 that has four exhaust flow passages 32A, 32B, 32C, and 32D that separate exhaust gas pulses from each cylinder 16A, 16B, 16C, and 16D, respectively, to improve energy transfer to the turbocharger 28. The first exhaust flow passage 32A has inlets 34A at the exhaust valves 24 of the first cylinder 16A, and extends to a first outlet 36A at a side face 38 of the cylinder head 12. The second exhaust flow passage 32B has inlets 34B at the exhaust valves 24 of the second cylinder 16B, and extends to a first common flow passage 40 that empties into a second outlet 36B at the side face 38. The third exhaust flow passage 32C has inlets 34C at the exhaust valves 24 of the third cylinder 16C, and extends to the first common flow passage 40 that empties into a second outlet 36B at the side face 38. The second and third exhaust flow passages 32B, 32C thus merge together in the cylinder head 12 at the first common flow passage 40 so that exhaust flow from both the second and third cylinders 16B, 16C exits through the second outlet 36B. The fourth exhaust flow passage 32D has inlets 34D at the exhaust valves 24 of the fourth cylinder 16D, and extends to a third outlet 36C at a side face 38 of the cylinder head 12. The outlets 36A, 36B, 36C are the only outlets of the integrated exhaust manifold 30. Thus, each of the outer cylinders 16A, 16D has a separate, dedicated exhaust flow passage 32A, 32D, respectively, through the integrated exhaust manifold 30, while exhaust flow passages 32B, 32C of the inner cylinders 16B, 16C combine or merge together at the first common flow passage 40 before exiting the exhaust flow manifold 30.

As shown in FIG. 2, the twin scroll turbocharger 28 has a turbocharger housing 42 that defines a first scroll passage 45A and a second scroll passage 45B. As is understood by those skilled in the art, a twin scroll turbocharger has first and second sets of vanes, referred to as scrolls, which are connected to a turbine wheel to spin a turbine and force more air into the cylinders 16A, 16B, 16C, 16D when respective ones of the intake valves 22 are open. The first scroll passage 45A leads to a first scroll, and the second scroll passage 45B leads to a second scroll. The turbocharger housing 42 has a face 43 with only three inlets 46A, 46B, 46C. FIG. 2 shows a wastegate port 47 that feeds to a wastegate that bypasses the turbine, as is understood by those skilled in the art. The turbocharger housing 42 is mounted to the cylinder head 12 with the face 43 sealed to the side face 38 so that the three inlets 46A, 46B, 46C of the turbocharger housing 42 are in fluid communication with the three outlets 32A, 32B, 32C of the cylinder head 12. In other words, the turbocharger housing 42 directly mounts to the cylinder head 12 without any flow adapter therebetween. Configuring the cylinder head 12 and the turbocharger housing 42 such that no flow adapter is used reduces part count and assembly time. Exhaust gas from the first exhaust flow passage 32A flows out of the first outlet 36A only into the first inlet 46A. Exhaust gas from the second and third exhaust flow passages 32B, 32C flows out of the second outlet 36B only into the second inlet 46B. Exhaust gas from the fourth exhaust flow passage 32D flows out of the third outlet 36C only into the third inlet 46C. Exhaust gas from the first exhaust flow passage 32A thus remains isolated from exhaust gas in the other exhaust flow passages in the cylinder head 12 and flows separately into the first inlet 46A of the housing 42, and exhaust gas from the fourth exhaust flow passage 32D remains isolated in the cylinder head 12 from exhaust gas in the other exhaust flow passages and flows separately into the third inlet 46C of the housing 42.

In the housing 42, the second inlet 46B leads into a second flow passage 48B to the first scroll passage 45A, so that exhaust gas flows from the second inlet 46B to the first scroll passage 45A. The housing 42 is configured so that the exhaust gas flow through the first and third flow passages 48A, 48C joins in the housing 42 at a second common flow passage 50 and from there flows to the second scroll passage 45B. The exhaust flow from the first and fourth cylinders 16A, 16D thus joins in the housing 42 at the second common flow passage 50 to flow through the second scroll passage 45B.

The integrated exhaust flow manifold 30 is configured so that the sum of the surface area of the first exhaust flow passage 32A and the surface area of the fourth exhaust flow passage 32D (i.e., a combined first surface area) is substantially equal to the sum of the surface area of the second exhaust flow passage 32B, the surface area of the third exhaust flow passage 32C, and the surface area of the first common flow passage 40 (i.e., a combined second surface area). In other words, the surface area of the exhaust flow passage 32A from the inlets 34A at the exhaust valves 24 to the outlet 36A plus the surface area of the exhaust flow passage 32D from the inlets 34D at the exhaust valves 24 to the outlet 36C is substantially equal to the combined surface area of the exhaust flow passages 32B and 32C from the exhaust valves 24 to the first common flow passage 40 plus the surface area of the first common flow passage 40 to the outlet 36B. As used herein, substantially equal means that the surface area of the exhaust flow passages 32A from the inlets 34A at the exhaust valves 24 to the outlet 36A plus the surface area of the exhaust flow passage 32D from the inlets 34D at the exhaust valves 24 to the outlet 36C is within 10 percent of the combined surface area of the exhaust flow passages 32B and 32C from the exhaust valves 24 to the first common flow passage 40 plus the surface area of the first common flow passage 40 to the outlet 36B. Additionally, the cylinder head 12 can be configured so that the lengths L1 and L4 of the outer exhaust flow passages 32A and 32D (i.e., the lengths along a center thereof from the inlets 34A to the outlet 36A, or from the inlets 34D to the outlet 36C), are within about 9 millimeters of the lengths L2 and L3 through the exhaust flow passages 32B and 32C and the first common flow passage 40 from the inlets 34B or 34C to the center outlet 36B. With this configuration, overall heat rejection from the exhaust flow passages 32A-32D is reduced. The temperature difference in exhaust flow at the three outlets 36A, 36B, 36C and the temperature difference between the turbocharger scrolls 45A, 45B is minimized. For example, the reduction in heat rejection may be up to 8 kilowatts while the temperature difference between the scrolls may be approximately 15 degrees Celsius. Moreover, assuming the engine firing order is first, third, fourth, second cylinders 16A, 16C, 16D, 16B, then the turbocharger efficiency and engine performance can be improved by balancing heat flow from the powered cylinders to the turbocharger 28, also creating an improved pathway to the catalyst for a reduction in time to achieve a catalyst light off temperature in a downstream catalytic converter.

Figure 5:
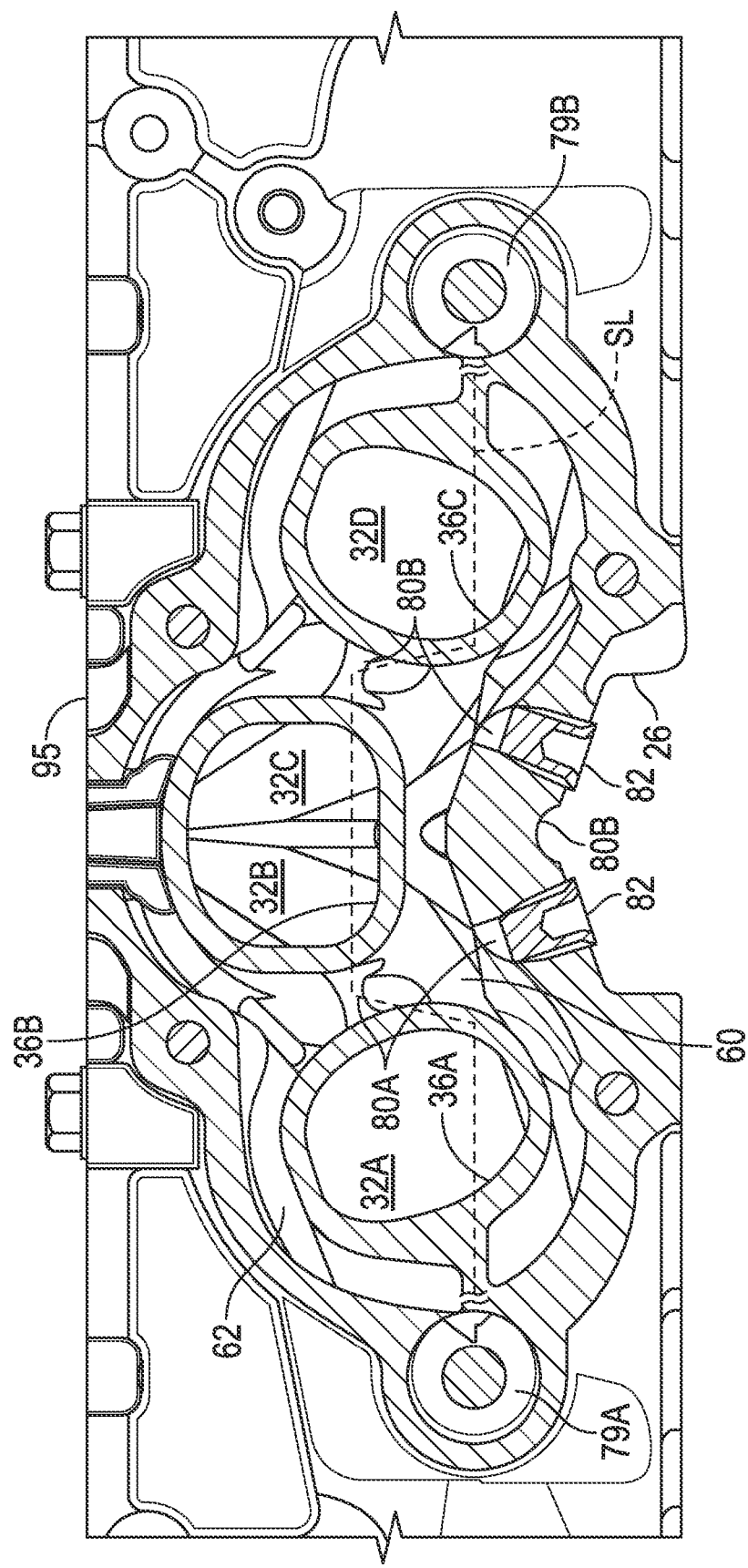
FIG. 5 is a schematic illustration in fragmentary cross-sectional view of the cylinder head of FIG. 1 taken at lines 5-5 in FIG. 1.

The configuration of the integrated exhaust manifold 30 enables the placement of coolant cavities that simplify manufacturing of the cylinder head 12 while providing efficient cooling of the cylinder head 12 especially in the vicinity of the exhaust flow passages 32A, 32B, 32C, 32D. Specifically, as best shown in FIG. 5, the cylinder head 12 has a first coolant cavity 60 positioned adjacent to each of the exhaust flow passages 32A, 32B, 32C, 32D. A second coolant cavity 62 is also positioned adjacent to each of the exhaust flow passages 32A, 32B, 32C, and 32D. The exhaust flow passages 32A, 32B, 32C, 32D are positioned between the first coolant cavity 60 and the second coolant cavity 62. The first coolant cavity 60 is also referred to as a first water jacket or a lower water jacket as it is positioned below the exhaust flow passages 32A, 32B, 32C, 32D, and the second coolant cavity 62 is referred to as a second water jacket or an upper water jacket as it is positioned above the exhaust flow passages 32A, 32B, 32C, 32D. Although referred to as water jackets, any suitable coolant can be contained in the coolant cavities 60, 62.

Figure 9:
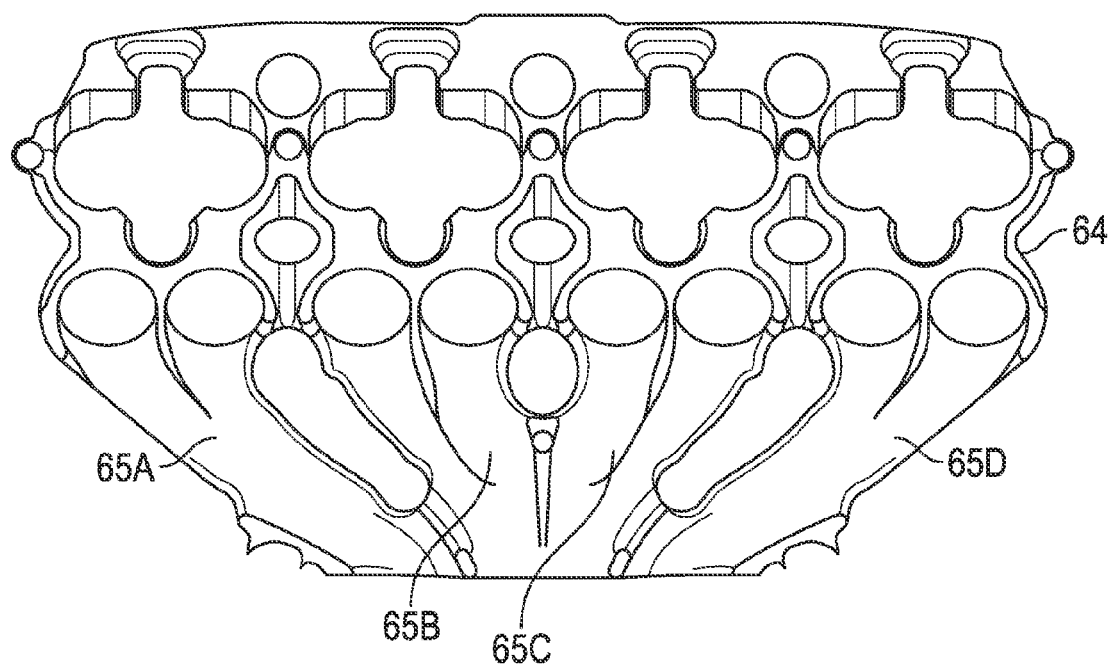
FIG. 9 is a schematic illustration in plan view of a first coolant core for a first coolant cavity in the cylinder head of FIG. 1.

As is apparent in FIG. 5, the first and the second coolant cavities 60, 62 together substantially surround the exhaust passages 32A, 32B, 32C, 32D at the three outlets 36A, 36B, 36C of the integrated exhaust manifold 30. FIG. 9 shows a first coolant core 64 used during casting of the cylinder head 12 to form the first coolant cavity 60 in the cylinder head 12. The first coolant core 64 is a unitary, single core that has four interconnected coolant passages 65A, 65B, 65C, and 65D. The first coolant core 64 can be formed in a single core box having only an upper half mold and a lower half mold.

Figure 10:
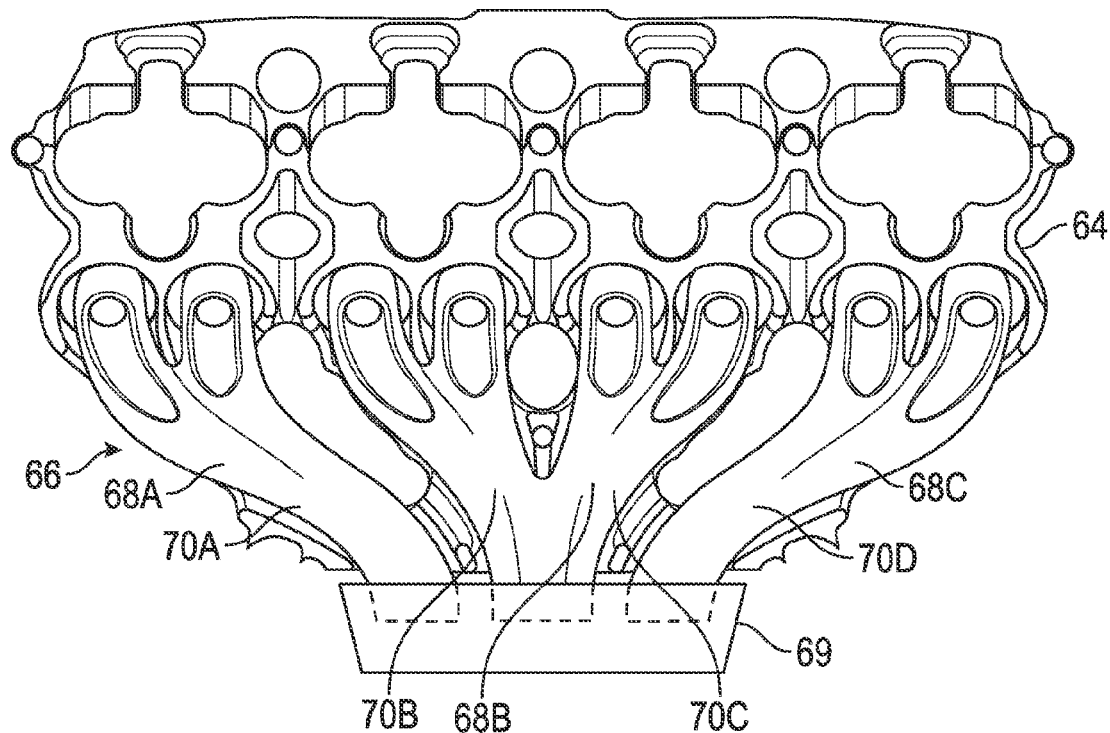
FIG. 10 is a schematic illustration in plan view of the first coolant core of FIG. 9 with the exhaust port sand core of FIG. 9 positioned relative thereto and both held by the external core locating block of FIG. 8.

FIG. 10 shows an exhaust port sand core 66 used during casting of the cylinder head 12 to form the integrated exhaust manifold 30 in the cylinder head 12. The exhaust port sand core 66 has three core sections 68A, 68B, 68C held in a core locating block 69 to establish the relative positions of the core sections 68A, 68B, 68C to correspond with the desired positions of the exhaust flow passages 32A, 32B, 32C, 32D in the cylinder head 12. The first core section 68A has a first exhaust flow passage core section 70A that forms the first exhaust flow passage 32A. The second core section 68B has a second and a third exhaust flow passage core section 70B, 70C that form the second and the third exhaust flow passages 32B, 32C in the cylinder head 12. The second and third exhaust flow passage core sections 70B, 70C merge together to form a first common flow passage core section 72 that form the first common flow passage 40 in the cylinder head 12. The third core section 68C is a fourth exhaust flow passage core section 70D that forms the fourth exhaust flow passage 32D. The intake port sand core is not shown.

Figure 8:
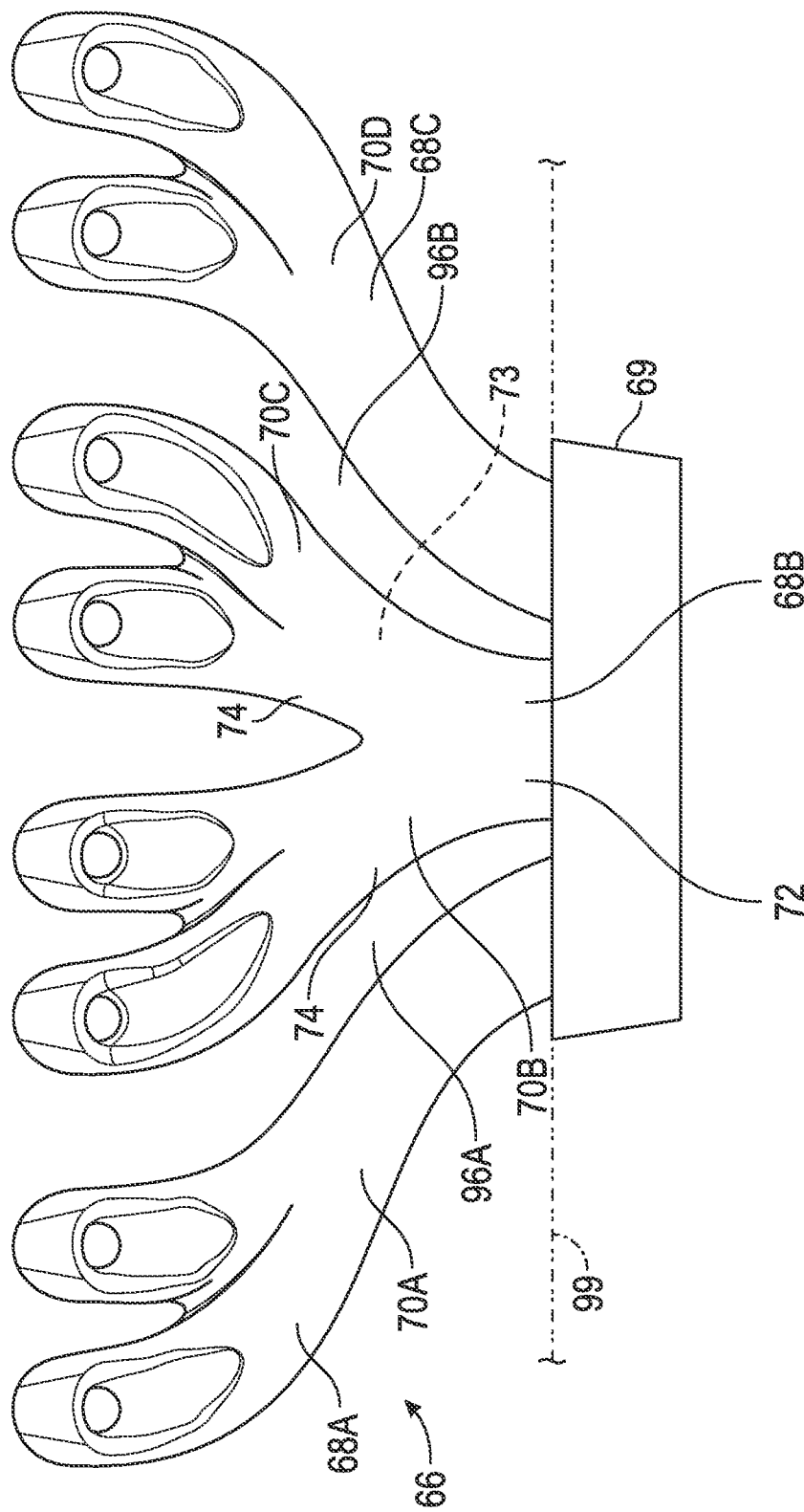
FIG. 8 is a schematic illustration in plan view of the exhaust port sand core molded in the core box of FIG. 6 held by an external core locating block and showing a boundary of the cylinder head in phantom.

The exhaust port sand core 66 has a first side 73 (i.e., a lower side) and a second side 74 (i.e., an upper side) indicated in FIG. 8. The first side 72 is a lower side and the second side 74 is an upper side of the exhaust port sand core 66. The first coolant core 64 is positioned on the first side 73 of the exhaust port sand core 66. It is apparent in FIGS. 9 and 10 that the coolant passages 65A, 65B, 65C, 65D of the first coolant core 64 are shaped to correspond to and surround the first side 73 of the exhaust flow passage core sections 70A, 70B, 70C, and 70D of the exhaust port sand core 66.

Figure 11:
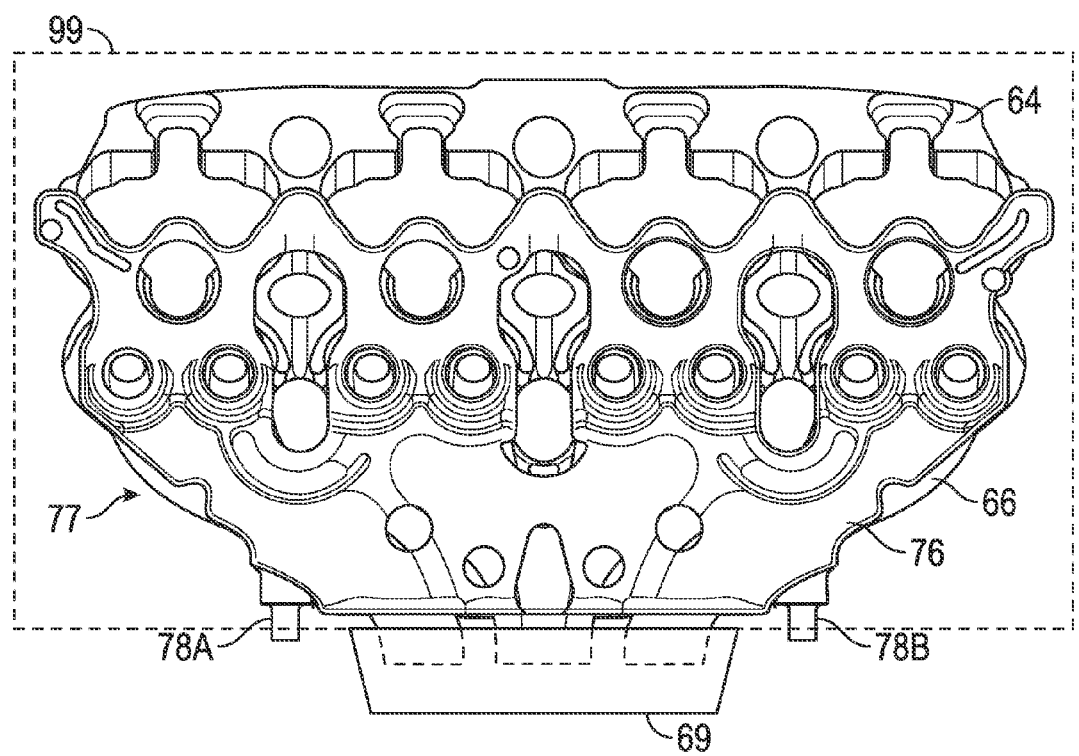
FIG. 11 is a schematic illustration in plan view of the first coolant core and exhaust port sand core of FIG. 10 with a second coolant core positioned relative thereto and all held by the external core locating block of FIG. 8.

FIG. 11 shows a second coolant core 76 used during casting of the cylinder head 12 to form the second coolant cavity 62 in the cylinder head 12 of FIG. 5. The second coolant core 76 is a unitary, single core that is positioned on the second side 74 of the exhaust port sand core 66 (i.e., the upper side) opposite from the first side 72. The second coolant core 76 can be formed in a single core box having only an upper half mold and a lower half mold. The first and second coolant cores 64, 76 are positioned relative to the exhaust port sand core 66 by locating pins or the like. The exhaust port sand core 66, and the first and second coolant cores 64, 76 assembled together by use of the core locator box 69 and any pins constitutes a core assembly 77. The core assembly 77 is placed in a cylinder head die 99 shown schematically in phantom in FIG. 11. FIGS. 9-11 indicate that the coolant cores 64, 76 substantially surround the exhaust flow passage core sections 68A, 68B, 68C. The second coolant core 76 has coolant entrance and exit ports 78A, 78B. The resulting entrance and exit ports 79A, 79B in the cast cylinder head 12 are shown in FIG. 5. In order to connect the resultant coolant cavities 60, 62 after casting of the cylinder head 12, during machining of the cylinder head 12, at least two and up to five passages are machined to connect the cooling cavities 60, 62. A first machined passage 80A is machined in the cylinder head 12 to extend between and connect the coolant cavities 60, 62, without intersecting any of the exhaust flow passages 32A, 32B, as shown in FIG. 5. Similarly, a second machined passage 80B is machined in the cylinder head 12 to extend between and connect the coolant cavities 60, 62, without intersecting any of the exhaust flow passages 32C, 32D. The machined passages 80A, 80B may be drilled passages, such as by drilling from the lower side 26 of the cylinder head 12, below the cylinder head 12 in FIG. 5. Plugs 82 are then inserted to plug the ends of the machined passages 80A, 80B.

Figure 4:
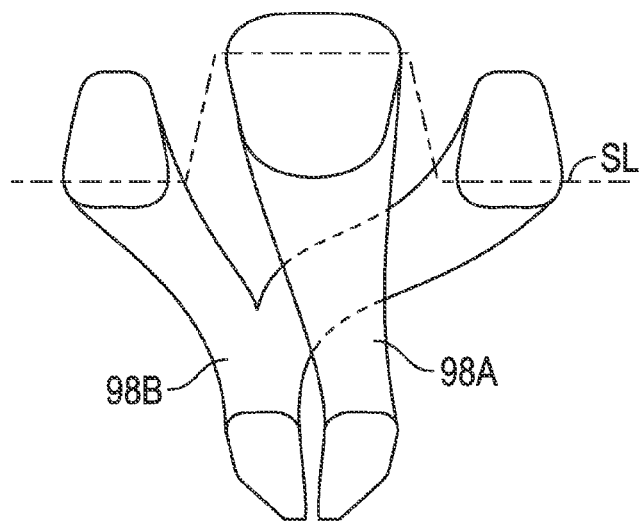
FIG. 4 is a schematic front view illustration of scroll passage cores for the twin scroll turbocharger of FIG. 2 showing a core box split line in phantom.
Figure 6:
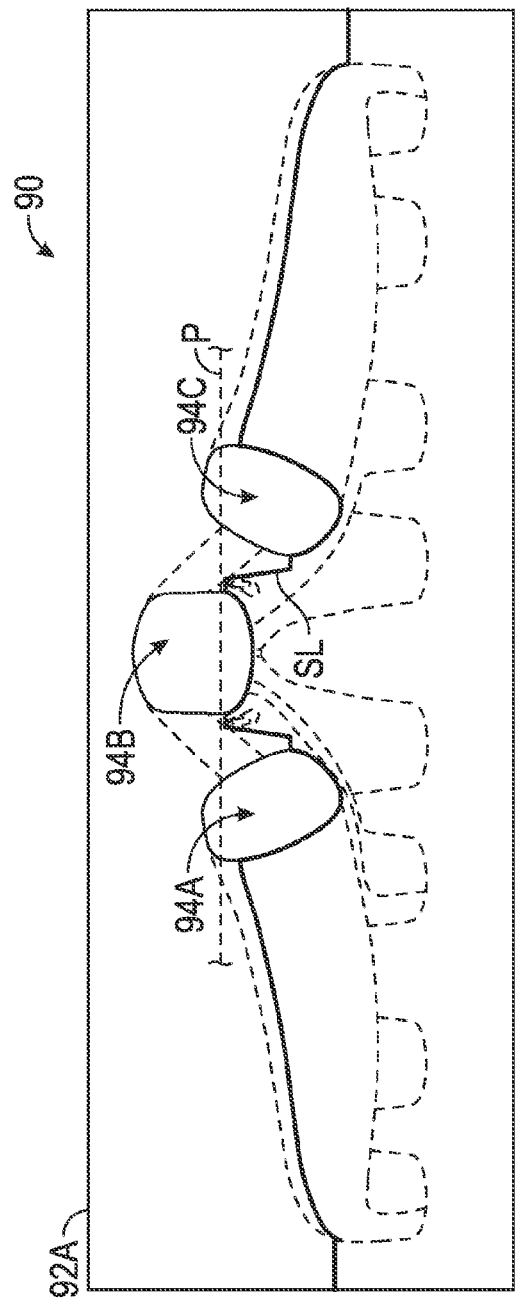
FIG. 6 is a schematic illustration in front view of a two-piece core box having an upper half mold and a lower half mold for an exhaust port sand core used to manufacture the cylinder head of FIG. 1.
Figure 7:
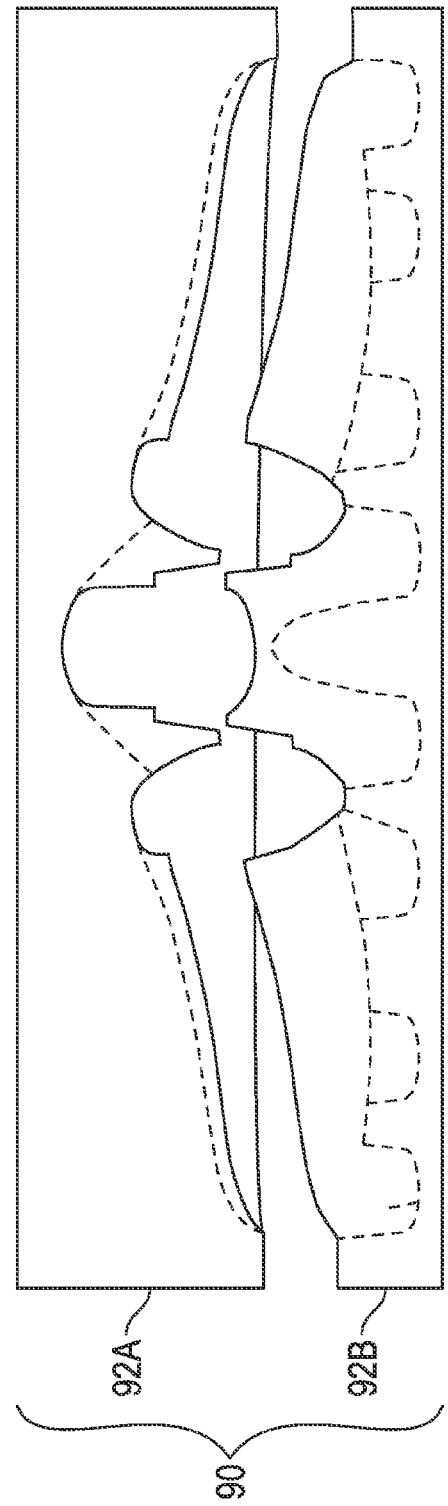
FIG. 7 is a schematic illustration in exploded view of the two-piece core box of FIG. 6.

FIG. 6 shows a two-piece core box 90 having an upper half mold 92A and a lower half mold 92B for molding the exhaust port sand core 66 of FIG. 8. When the upper half mold 92A and the lower half mold 92B are closed together, as shown in FIG. 6, the molds 92A, 92B together form cavities 94A, 94B, 94C that are the same shape as the exhaust port sand core 66. None of the exhaust flow passages 32A, 32B, 32C, 32D overlap one another in a vertical direction, as is apparent from the core sections 68A, 68B, 68C of FIGS. 8 and 10 used to form the integrated exhaust manifold 30 in the cylinder head 12 during casting. In other words, the exhaust flow passages 32A, 32B, 32C, 32D do not overlap one another in a direction from the lower side 26 of the cylinder head 12 to an upper side 95 of the cylinder head 12 indicated in FIG. 5. Such an exhaust manifold 30 is referred to as a single plane integrated exhaust manifold, as a single plane can intersect all of the exhaust flow passages 32A, 32B, 32C, 32D of the exhaust manifold 30 in a horizontal direction at any point along the length of the passages 32A, 32B, 32C, 32D between the side face 38 of the cylinder head 12 and the exhaust valves 24, and there is no vertical overlap between the exhaust flow passages 32A, 32B, 32C, 32D, as is evident by the continuous gaps 96A, 96B between the core sections 70A, 70B, and 70B, 70C, respectively. One such plane P is indicated in fragmentary view in FIG. 1 and in side view in FIG. 6. Molding of the exhaust port sand core 66 is thus simplified, and only the two-piece core box 90 is required. No slides or other tooling is necessary. The material used to form the exhaust port sand core 66 is placed between the upper and lower half molds 92A, 92B when they are apart, as shown in FIG. 7. The molds 92A, 92B are then moved together in a single direction to form the sand core 66. A split line SL between the upper and lower half molds 92A, 92B indicated in FIG. 6 is overlaid in phantom on the cylinder head 12 in FIG. 5. In FIG. 4, the split line SL is also overlaid on the core sections 98A, 98B used to form the flow passages 48A, 48B, 48C of the turbocharger housing 42. Two core boxes will be required to form the core sections 98A, 98B for the turbocharger 28.

Figure 12:
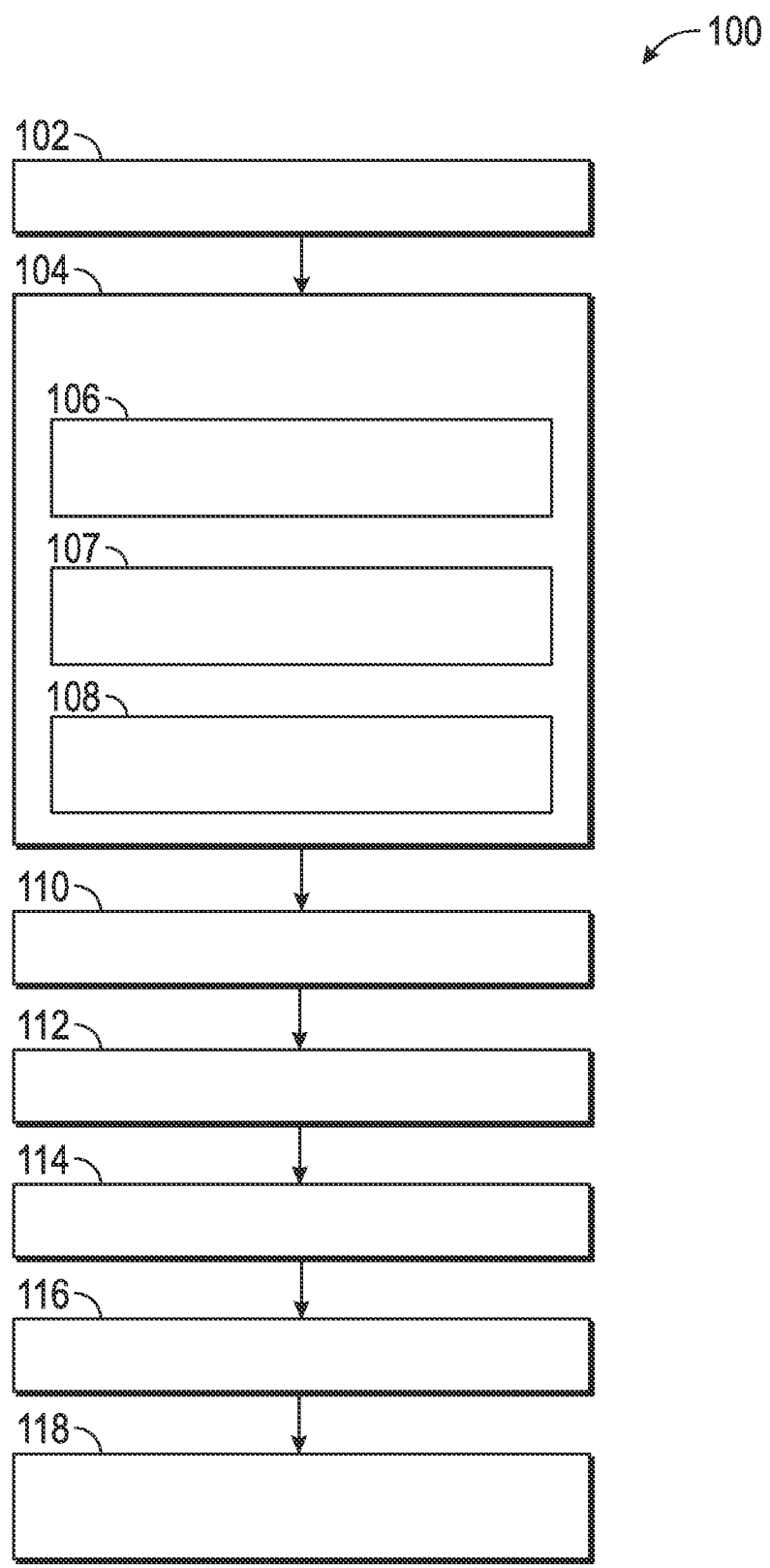
FIG. 12 is a flow diagram of a method of manufacturing the cylinder head of FIG. 1.

Referring to FIG. 12, a flow diagram illustrates a method 100 of manufacturing a cylinder head for an in-line four cylinder engine cylinder block, such as cylinder head 12 of FIG. 1. The method 100 includes step 102, molding an exhaust port sand core 66 in a single core box 90 having only an upper half mold 92A and a lower half mold 92B. The two-piece core box 90 has no slides or loose parts. The exhaust port sand core 66 has four exhaust flow passage core sections 70A, 70B, 70C, 70D, two of which merge together. That is, the center two exhaust flow passage core sections 70B, 70C merge together. An intake port sand core (not shown) and the first and second coolant cores 64, 76 are also molded prior to proceeding.

The method 100 further includes step 104, assembling a core assembly 77 to be used during casting of the cylinder head 12. Step 104 may include sub-step 106, installing a first coolant core 64 in the cylinder head die 99 (i.e., a coolant core for the lower coolant cavity 60). Step 104 may also include sub-step 107, installing the exhaust port sand core 66 in the cylinder head die 99 so that the first coolant core 64 is on a lower, first side 73 of the exhaust port sand core 66. An intake port sand core (not shown) and any additional cores used in the area where the camshaft mounts and around the front of the cylinder head may also be installed at this time. Step 104 may also include sub-step 108, installing a second coolant core 76 (i.e., a coolant core for the upper coolant cavity 62) in the cylinder die 99 on the upper second side 74 of the exhaust port sand core 66.

Next, the cylinder head die 99 is closed in step 110. The cylinder head 12 is cast around the core assembly 77 in the cylinder head die 99 is step 112. This causes the integrated exhaust manifold 30 to be formed by the exhaust port sand core 66, and first and second coolant cavities 60, 62 to be formed by the first and second coolant cores 64, 76, respectively. The integrated exhaust manifold 30 has four axially arranged exhaust flow passages 32A, 32B, 32C, 32D, of which the inner two 32C, 32D merge into a single exhaust flow passage (common flow passage 40) in correspondence with the four exhaust flow passage core sections 70A, 70B, 70C, 70D of the exhaust port sand core 66, such that the integrated exhaust manifold 30 has three outlets 36A, 36B, 36C.

Once the cylinder head 12 is cast, the cylinder head 12 is machined, which includes machining a first connector passage 80A through the cylinder head 12 between two of the exhaust flow passages 32A, 32B to connect the first coolant core 64 with the second coolant core 76 in step 114. Similarly, machining the cylinder head 12 includes machining a second connector passage 80B is machined through the cylinder head 12 between a different two of the exhaust flow passages (i.e., between passages 32C and 32D) to connect the first coolant core 64 with the second coolant core 76 in step 116. Additional machined passages may be machined in the cylinder head to connect the first coolant core 64 with the second coolant core 76 to enhance cooling. For example, up to three additional machined passages for a total of five machined passages may be machined in one embodiment. The engine assembly 10 can then be assembled, which includes mounting the twin scroll turbocharger 28 to the cylinder head 12 in step 118. The twin scroll turbocharger 28 has a housing 42 with a first scroll passage 45A, a second scroll passage 45B, and only three inlets 46A, 46B, 46C. In step 118, the housing 42 is mounted to the cylinder head 12 with the three inlets 46A, 46B, 46C of the housing 42 in fluid communication with the three outlets 36A, 36B, 36C of the cylinder head 12.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An assembly for an engine cylinder block having four in-line cylinders arranged in axial order as a first cylinder, a second cylinder, a third cylinder, and a fourth cylinder, the assembly comprising:

a cylinder head with an integrated exhaust manifold that has four exhaust flow passages directing cylinder exhaust from inlets arranged to correspond with exhaust from the four cylinders, respectively, and has only three outlets at a side face of the cylinder head; wherein none of the exhaust flow passages of the integrated exhaust manifold overlap one another in a vertical direction;

a twin scroll turbocharger having a housing with a first scroll passage, a second scroll passage, and only three inlets; wherein the housing is mounted directly to the side face of the cylinder head without a flow adapter therebetween, with the three inlets of the housing at the side face and in fluid communication with the three outlets of the cylinder head; wherein none of the three inlets of the twin scroll turbocharger overlap in the vertical direction at the side face;

wherein the integrated exhaust manifold and the housing are configured so that two of the exhaust flow passages join in the cylinder head to direct exhaust flow into only one of the inlets of the housing and through the first scroll passage, and exhaust flow through the other two of the exhaust flow passages flows separately into the other two inlets in the housing and joins in the housing to flow through the second scroll passage.

2. The assembly of claim 1, wherein the cylinder head has:
- a first coolant cavity positioned adjacent to each of the exhaust flow passages;
- a second coolant cavity positioned adjacent to each of the exhaust flow passages with the exhaust flow passages between the first coolant cavity and the second coolant cavity;
- wherein the first and the second coolant cavities together substantially surround the exhaust passages at the three outlets of the integrated exhaust manifold.

3. The assembly of claim 1, wherein the cylinder head has:
- a first coolant cavity positioned adjacent to each of the exhaust flow passages;
- a second coolant cavity positioned adjacent to each of the exhaust flow passages with the exhaust flow passages between the first coolant cavity and the second coolant cavity;
- at least a first and a second machined passage extending through the cylinder head past the exhaust flow passages without intersecting the exhaust flow passages and connecting the first coolant cavity with the second coolant cavity.

4. The assembly of claim 1, wherein a first combined surface area of the two exhaust flow passages that join in the cylinder head is substantially equal to a second combined surface area of the other two exhaust flow passages.

5. An assembly for an engine cylinder block having four in-line cylinders arranged in axial order as a first cylinder, a second cylinder, a third cylinder, and a fourth cylinder, the assembly comprising:
- a cylinder head having an integrated exhaust manifold with only three outlets at a face of the cylinder head; wherein the three outlets include a first outlet, a second outlet, and a third outlet, with the second outlet positioned between the first outlet and the third outlet;
- wherein the integrated exhaust manifold has:
  - a first exhaust flow passage in fluid communication with only the first cylinder and extending to the first outlet;
  - a second exhaust flow passage in fluid communication with the second cylinder;
  - a third exhaust flow passage in fluid communication with the third cylinder;
  - a fourth exhaust flow passage in fluid communication with only the fourth cylinder and extending to the third outlet;
  - a first common flow passage in fluid communication with both the second and the third exhaust flow passages and with the second outlet such that both of the second and third exhaust flow passages join at the first common flow passage to allow exhaust gas flow to the second outlet; and
- a housing for a twin scroll turbocharger having a first scroll passage, a second scroll passage, and only three inlets at a face of the housing; wherein the three inlets include a first inlet, a second inlet, and a third inlet, with the second inlet positioned between the first inlet and the third inlet;
- wherein the housing has:
  - a first flow passage extending from the first inlet;
  - a second flow passage extending from only the second inlet to only the second scroll passage;
  - a third flow passage extending from only the third inlet;
  - a second common flow passage in fluid communication with each of the first flow passage and the third flow passage such that both of the first flow passage and the third flow passage join at the second common flow passage to flow into the first scroll passage;
- wherein the housing is directly mounted to the face of the cylinder head without a flow adapter therebetween so that the first inlet is in fluid communication with only the first outlet, the second inlet is in fluid communication with only the second outlet, and the third inlet is in fluid communication with only the third outlet;
- wherein none of the exhaust flow passages of the integrated exhaust manifold overlap one another in a vertical direction; and wherein none of the three inlets of the housing of the twin scroll turbocharger overlap in the vertical direction at the face of the cylinder head.

6. The assembly of claim 5, wherein the cylinder head has:
- a first coolant cavity positioned adjacent to each of the exhaust flow passages;
- a second coolant cavity positioned adjacent to each of the exhaust flow passages with the exhaust flow passages between the first coolant cavity and the second coolant cavity; and
- wherein the first and the second coolant cavities together substantially surround the exhaust passages at the first, second and third outlets of the integrated exhaust manifold.

7. The assembly of claim 5, wherein the cylinder head has:
- a first coolant cavity positioned adjacent to each of the exhaust flow passages;
- a second coolant cavity positioned adjacent to each of the exhaust flow passages with the exhaust flow passages between the first coolant cavity and the second coolant cavity;
- a first machined passage extending between the first exhaust flow passage and the first common flow passage and connecting the first coolant cavity with the second coolant cavity; and
- a second machined passage extending between the fourth exhaust flow passage and the first common flow passage and connecting the first coolant cavity with the second coolant cavity.

8. The assembly of claim 5, wherein a sum of a surface area of the first exhaust flow passage and a surface area of the fourth exhaust flow passage is substantially equal to a sum of a surface area of the second exhaust flow passage, a surface area of the third exhaust flow passage, and a surface area of the first common flow passage.

9. A method of manufacturing a cylinder head for an in-line four cylinder engine cylinder block, the method comprising:
- molding an exhaust port sand core in a single core box having only an upper half mold and a lower half mold; wherein the exhaust port sand core has four exhaust flow passage core sections, two of which merge together;
- assembling a core assembly in a cylinder head with a first coolant core on one side of the exhaust port sand core and a second coolant core on an opposite side of the exhaust port sand core;
- casting a cylinder head around the core assembly in the cylinder head die such that an integrated exhaust manifold is formed by the exhaust port sand core, and first and second coolant cavities are formed by the first and second coolant cores, respectively; and wherein the integrated exhaust manifold has four exhaust flow passages, two of which merge into a single exhaust flow passage in correspondence with the four exhaust flow core sections of the exhaust port sand core, such that the integrated exhaust manifold has only three outlets at a side face of the cylinder head; wherein none of the exhaust flow passages of the integrated exhaust manifold overlap one another in a vertical direction;

mounting a twin scroll turbocharger directly to the side face of the cylinder head; wherein the twin scroll turbocharger has a housing with a first scroll passage, a second scroll passage, and only three inlets; wherein the housing is mounted to the side face of the cylinder head with the three inlets of the housing in fluid communication with the three outlets of the cylinder head; and wherein none of the three inlets of the housing of the twin scroll turbocharger overlap in the vertical direction at the side face of the cylinder head.

10. The method of claim 9, further comprising:

machining a first connector passage through the cylinder head between two of the exhaust flow passages to connect the first coolant core with the second coolant core; and machining a second connector passage through the cylinder head between a different two of the exhaust flow passages to connect the first coolant core with the second coolant core.

\* \* \* \* \*